United States Patent [19]
Hainz

[11] Patent Number: 6,161,414
[45] Date of Patent: Dec. 19, 2000

[54] METHOD OF AND DEVICE FOR FINISHING CAGE WINDOWS

[75] Inventor: Volker Hainz, Heusenstamm, Germany

[73] Assignee: GKN Lobro GmbH, Offenbach, Germany

[21] Appl. No.: 09/321,774

[22] Filed: May 27, 1999

[30] Foreign Application Priority Data

May 30, 1998 [DE] Germany .......................... 198 24 394

[51] Int. Cl.⁷ .................................................. B21K 01/05
[52] U.S. Cl. .................................. 72/353.2; 29/898.067; 72/335
[58] Field of Search ........................ 29/898.067; 72/335, 72/353.2, 354.2, 398, 401, 471

[56] References Cited

FOREIGN PATENT DOCUMENTS 42 11 758 C2  10/1993  Germany .
876596         9/1961  United Kingdom .............. 29/898.067

OTHER PUBLICATIONS

Prof. Lurje, "Die Herstellung von Käfigen", Technologie der Wälzlagerherstellung, VEB Verlag Technik Berlin 1953.

*Primary Examiner*—Lowell A. Larson

[57] ABSTRACT

The invention relates to a method of finishing cage windows in a ball cage for a constant velocity universal ball joint. The ball cage for use with the present invention has the shape of an annular member which comprises two parallel annular edges and a convex outer face. On the outer face, there are punched uniformly circumferentially distributed cage windows each having two circumferentially extending edges. The circumferentially extending edges of the cage windows are smoothed and parallelized by a non-chip-producing method of deformation.

17 Claims, 5 Drawing Sheets

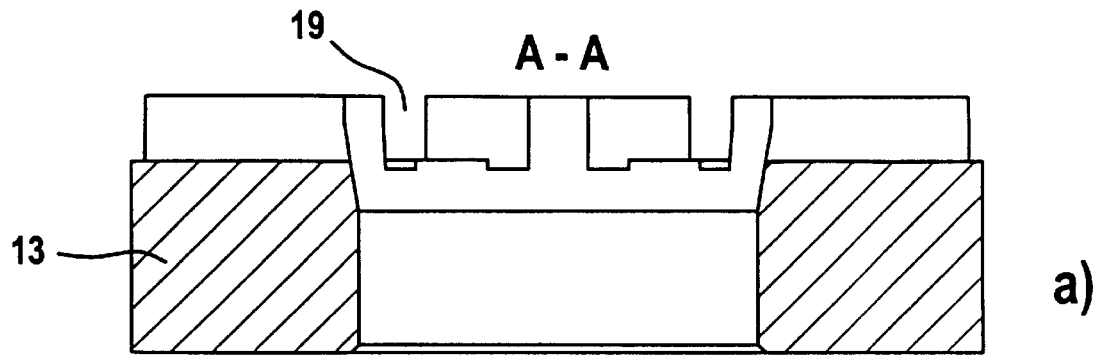
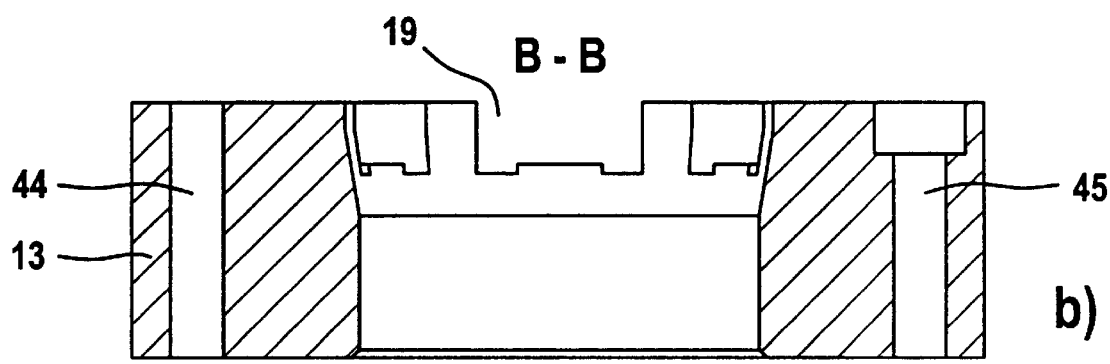
Fig. 4
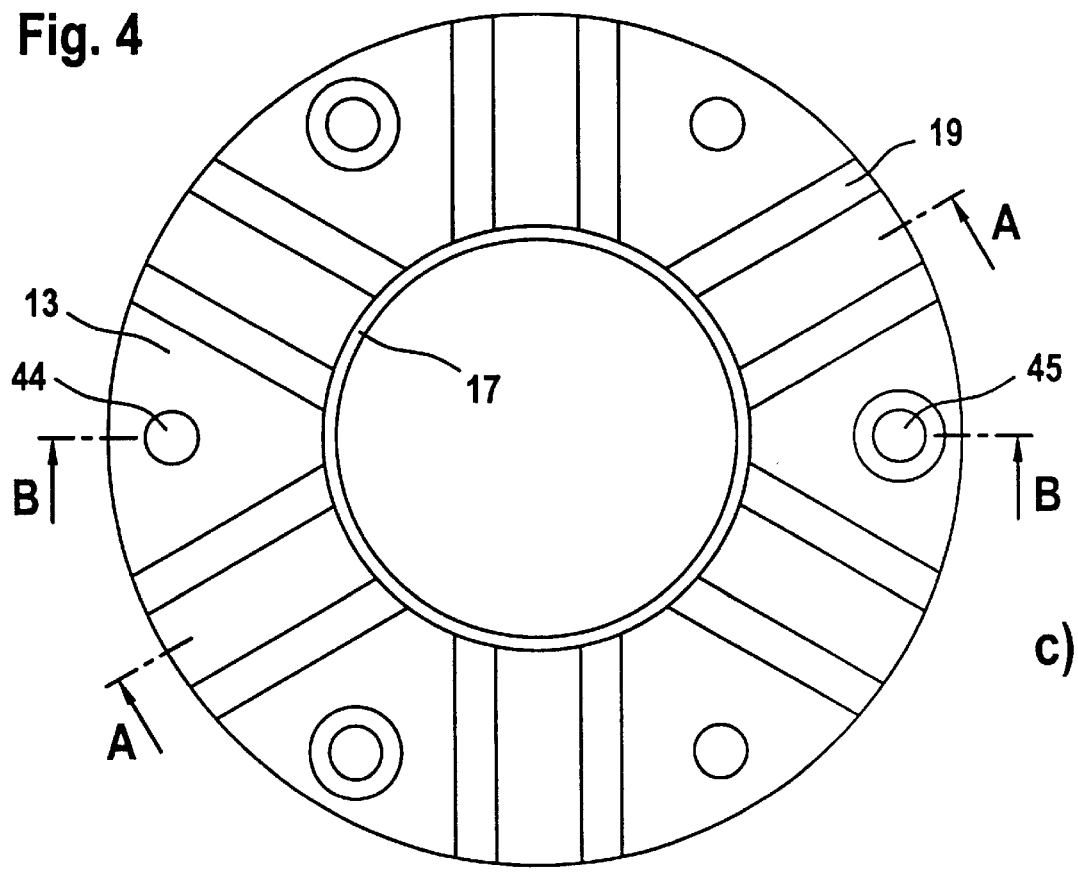

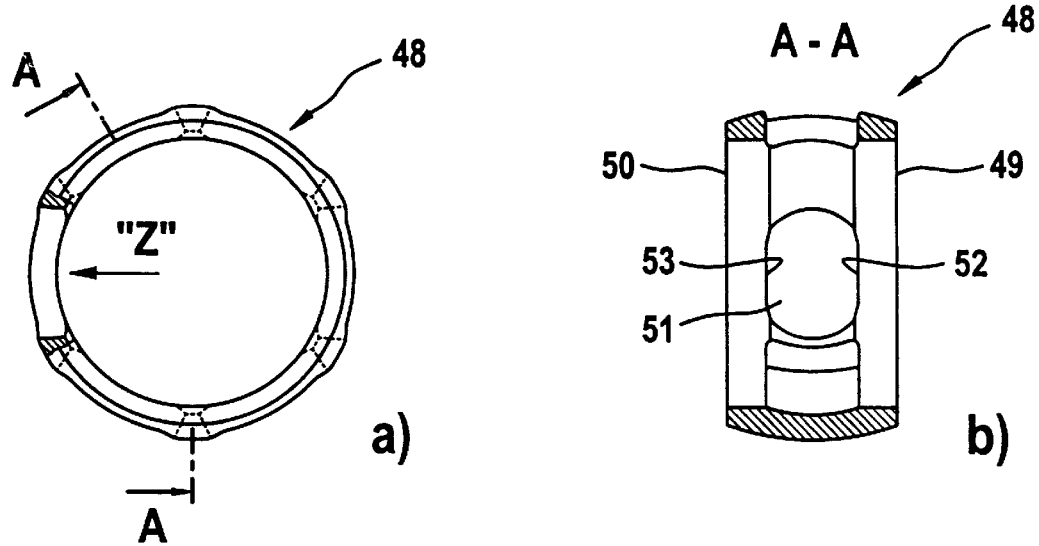
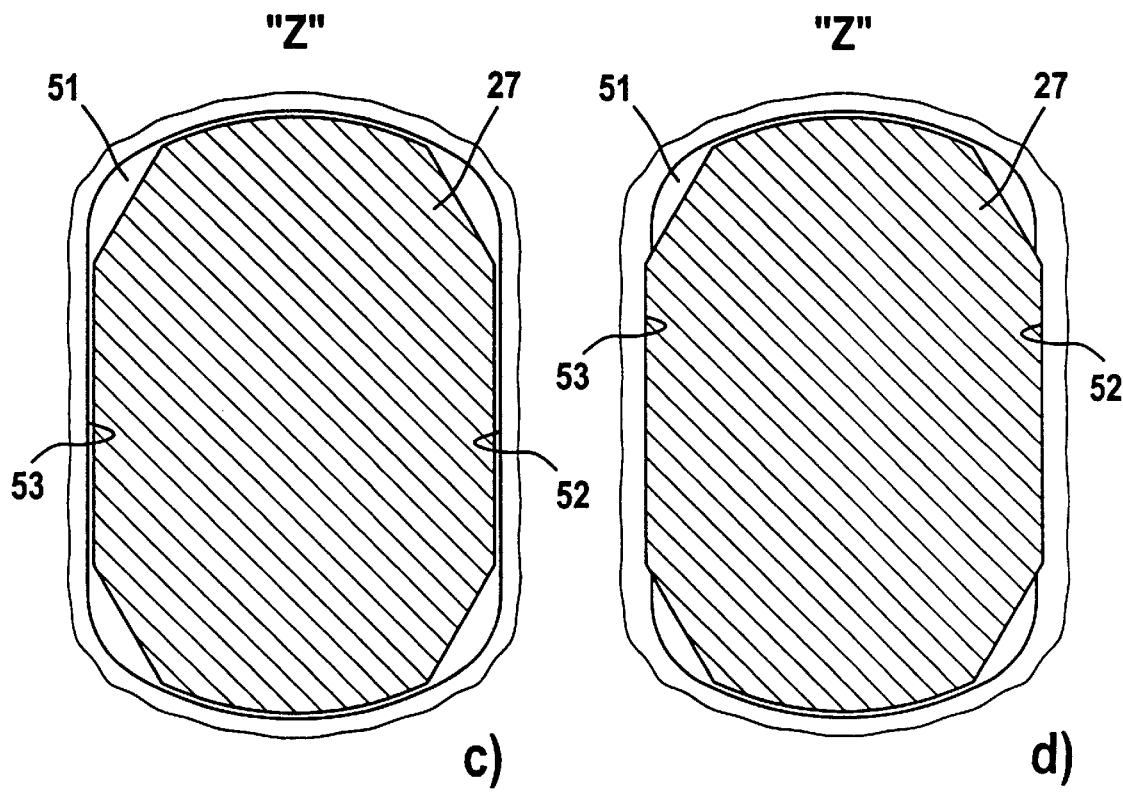
Fig. 5

METHOD OF AND DEVICE FOR FINISHING CAGE WINDOWS

BACKGROUND OF THE INVENTION

The invention relates to a method of and device for finishing cage windows in a ball cage for a constant velocity universal ball joint, which ball cage has the shape of an annular member which comprises two parallel annular edges and a convex outer face and out of which there are punched uniformly circumferentially distributed cage windows each having two circumferentially extending edges. The shape of the convex outer face of the annular member can be varied within wide limits in that, for example, it is possible to provide a spherical outer curvature or the shape of a double cone. The wall thickness of the cage is approximately constant, but it can comprise different thickness ratios within the range of a small-numbered multiple.

Following the assembly of a constant velocity universal ball joint, the inner edges of the cage windows constitute running faces for the balls guided in the cage windows. The quality of the running faces thus has to be good, both in respect of their peak-to-valley height and the parallelity of their lateral lines. The running faces also have to comprise a sufficient surface hardness.

In the case of prior art methods of finishing cage windows, punched cage windows whose edges are inadequate in respect of surface quality and parallelity, are first broached or milled, then hardened, and after having been hardened they are ground. Such a method is expensive and time-consuming, especially as the workpiece has to be re-clamped several times.

It is therefore the object of the invention to provide a simplified and cost-effective method of finishing the cage windows, as well as a suitable tool.

SUMMARY OF THE INVENTION

In accordance with the invention, the objective is achieved in that the circumferentially extending edges of the cage windows are smoothed and parallelized by a non-chip-producing method of deformation. For this purpose it is necessary to provide special tools which will be explained below. As compared to chip-forming surface machining prior to hardening, the inventive method is much quicker and more cost-effective and reduces the tolerances of the cage window width. Non-chip-forming deformation leads to a material compaction at the surface, which has a positive effect on the service life of the circumferentially extending edges of the cage windows, which edges act as running faces for the balls.

The inventive method may be executed, in a first embodiment, before carrying out the step of hardening the ball cage. By reducing the tolerances, it may be possible to do without grinding the cage window edges after the ball cage has been hardened.

According to a second embodiment, the circumferentially extending edges of the cage windows may be surface-layer-hardened before executing the inventive method. In this case, the circumferentially extending edges are pressed into the non-hardened material of the ball cage.

It is proposed to introduce supporting members into the cage windows with a small amount of play, that the annual member is deformed by pressure-loading the annular edges, with the axial distance between the annular edges relative to one another and between the circumferentially extending edges of the cage windows relative to one another being permanently reduced to such an extent that the circumferentially extending edges are smoothed and parallelized on the supporting members, i.e. the annular member is first produced with an excess axial dimension. The material of the entire annular member is then plastically deformed, as a result of which the shape can be simultaneously calibrated.

During the deformation process, the convex outer face of the annular member, from the outside, is supported radially and in a play-free way by dimensionally stable means. During the deformation process, only the circumferentially extending edges of the cage windows come into contact with the supporting members and the spreading members respectively, whereas the edges delimiting the intermediate webs can be positioned at a distance from the tools.

A device for carrying out the method is characterized by a lower tool and an upper tool which form parallel annular recesses for radially fixing the annular edges, by supporting members with smooth and parallel surfaces, which supporting members can be introduced with a small amount of play relative to the circumferentially extending edges into the cage windows of a radially fixed ball cage, and by means for reducing the distance between the lower tool and the upper tool in a direction extending perpendicularly to the planes of the annular recesses. In this context, it is proposed that the lower tool and the upper tool are each provided with inner supporting faces which are rotationally symmetric concentrically relative to the annular recesses and which, during the deformation process, approximately up to a central plane, are able to radially support the annular member from the outside in a play-free and dimensionally stable way. The supporting members are preferably introduced radially into the cage windows with a small amount of play. The lower tool and the upper tool can each be provided with radial grooves whose number corresponds to the number of supporting mandrels and which, while associated with one another in pairs, jointly serve to guide the supporting mandrels in the lower tool and in the upper tool. Furthermore, the supporting mandrels, at their inner ends, can be provided with wedge faces by means of which they are able, in their radially inner position, to mutually support one another annularly. The individual supporting mandrels are thus largely prevented from being displaced.

The lower tool and the upper tool can each be resiliently supported on a base plate or die plate to each of which there are fixed central pressure dies, so that, after the deformation process, there is achieved a certain ejection effect due to the spring-back of the tools. The pressure dies can be provided with centering projections which, together with the lower tool and upper tool, form the annular recesses and ensure the co-axial alignment of the cage relative to the tools.

BRIEF DESCRIPTION OF THE DRAWINGS

In order that the invention may be well understood, there will now be described several embodiments thereof, given by way of example, reference being made to the accompanying drawings, in which:

FIG. 4(a) shows vertical section of the lower tool of FIG. 4(c) taken along line A—A.

FIG. 4(b) shows the vertical section of the lower tool of FIG. 4(c) taken along line B—B.

FIG. 4(c) shows a plan view of one embodiment of the lower tool assembly.

FIG. 5(b) shows a sectional view of the ball cage of FIG. 5(a) taken along line A—A.

FIG. 5(c) shows the ball cage of FIG. 5(a) along view line "Z" prior to stamping.

FIG. 5(d) shows the ball cage of FIG. 5(a) along view line "Z" after stamping.

DETAILED DESCRIPTION OF THE PREFERRED EMBODIMENTS

Figure 1:
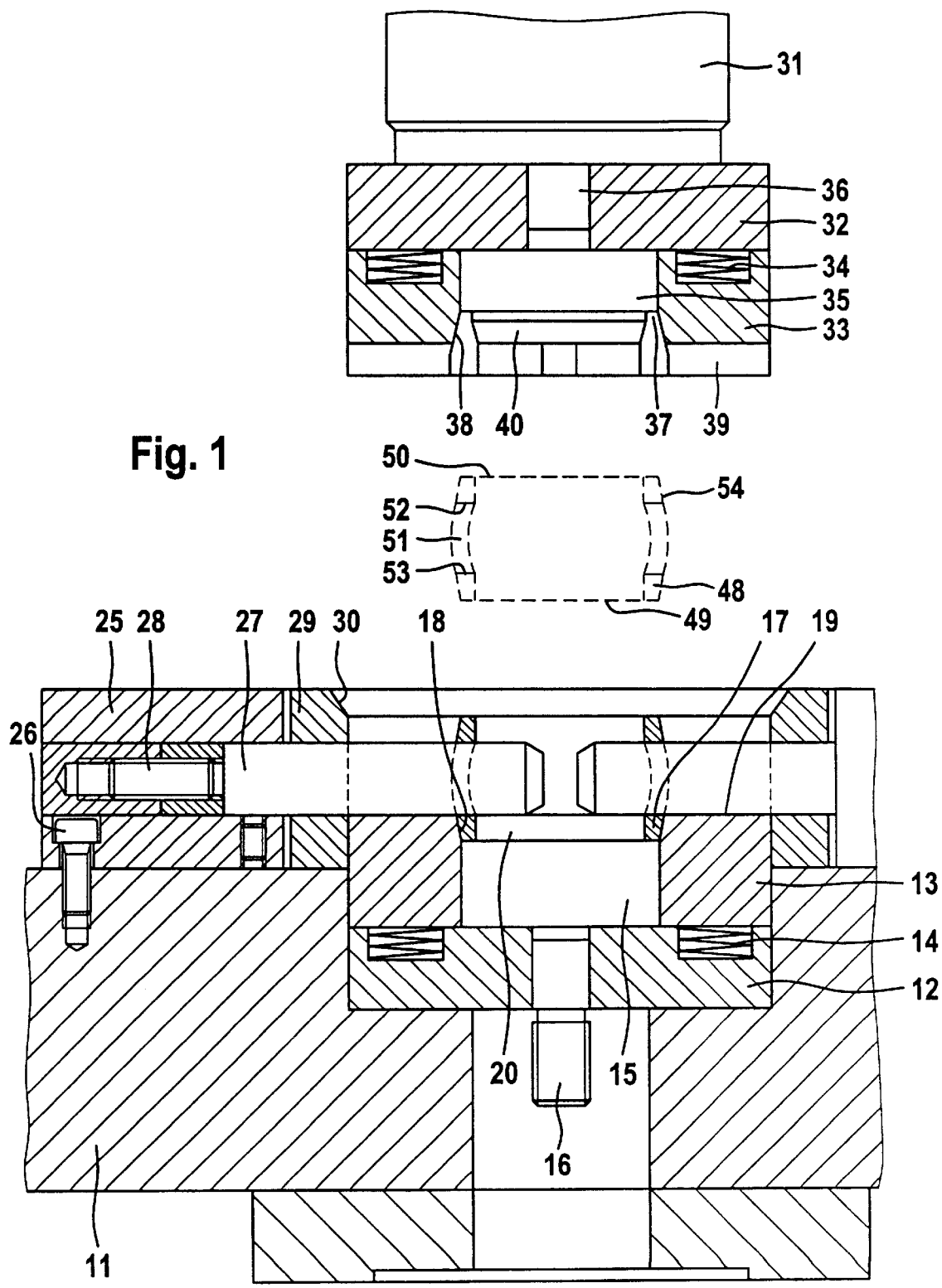
FIG. 1 is a vertical section through an upper and lower cage window finishing tool in accordance with an embodiment of the present invention.

FIG. 1 shows a multi-part machine frame 11 into which there has been inserted a base plate 12. On the base plate 12 there rests a lower tool 13 which is resiliently supported on the base plate 12 by means of circumferentially distributed plate spring packages 14. The lower tool 13 is guided on a pressure die 15 which is secured by bolting means 16 in the base plate 12. The lower tool 13, together with the pressure die 15, forms an annular recess 17. The lower tool 13, in its end face, comprises an annular inner supporting face 18 and circumferentially distributed radial groves 19. The pressure die 15 comprises a front centering projection 20.

An annular mandrel holding device 25 is clamped on to the frame 11 by means of bolts 26. Individual supporting mandrels 27 are radially aligned and radially adjustable by actuating means 28 in said frame 11. Inside the mandrel holding device 25, there is positioned, with play, a centering ring 29 which embraces the lower tool 13 in a play-free way and which serves to center the upper tool relative to the lower tool. For this purpose, the centering ring 29 is provided at is upper end with an inner cone 30.

Above the lower tool 13, at a distance therefrom, there is shown, in a highest position, a die tool 31 which holds a die plate 32. An upper tool 33 is resiliently supported by plate spring packages 34 on the die plate 32. The upper tool 33 is guided on the upper pressure die 35 which is secured by bolting means 36 in the die plate 32. Again, the upper tool 33, together with the pressure die 35, forms an annular recess 37. The upper tool 33 comprises an annular inner supporting face 38 and circumferentially distributed radial grooves 39 in its end face. The pressure die is provided with a front centering projection 40.

The ball cage 48, with its vertical axis, rests on the lower pressure die 15 in annular recess 17. The ball cage 48 is shown to be provided with a lower annular edge 49, an upper annular edge 50 and cage windows 51 with upper circumferentially distributed edges 52 and lower circumferentially distributed edges 53. The outer face 54 of the ball cage 48 is supported from the outside by the supporting face 18 of the lower tool 13. In the outermost inner position of the supporting mandrels 27 as illustrated, he latter are introduced into the cage windows 51.

Figure 2:
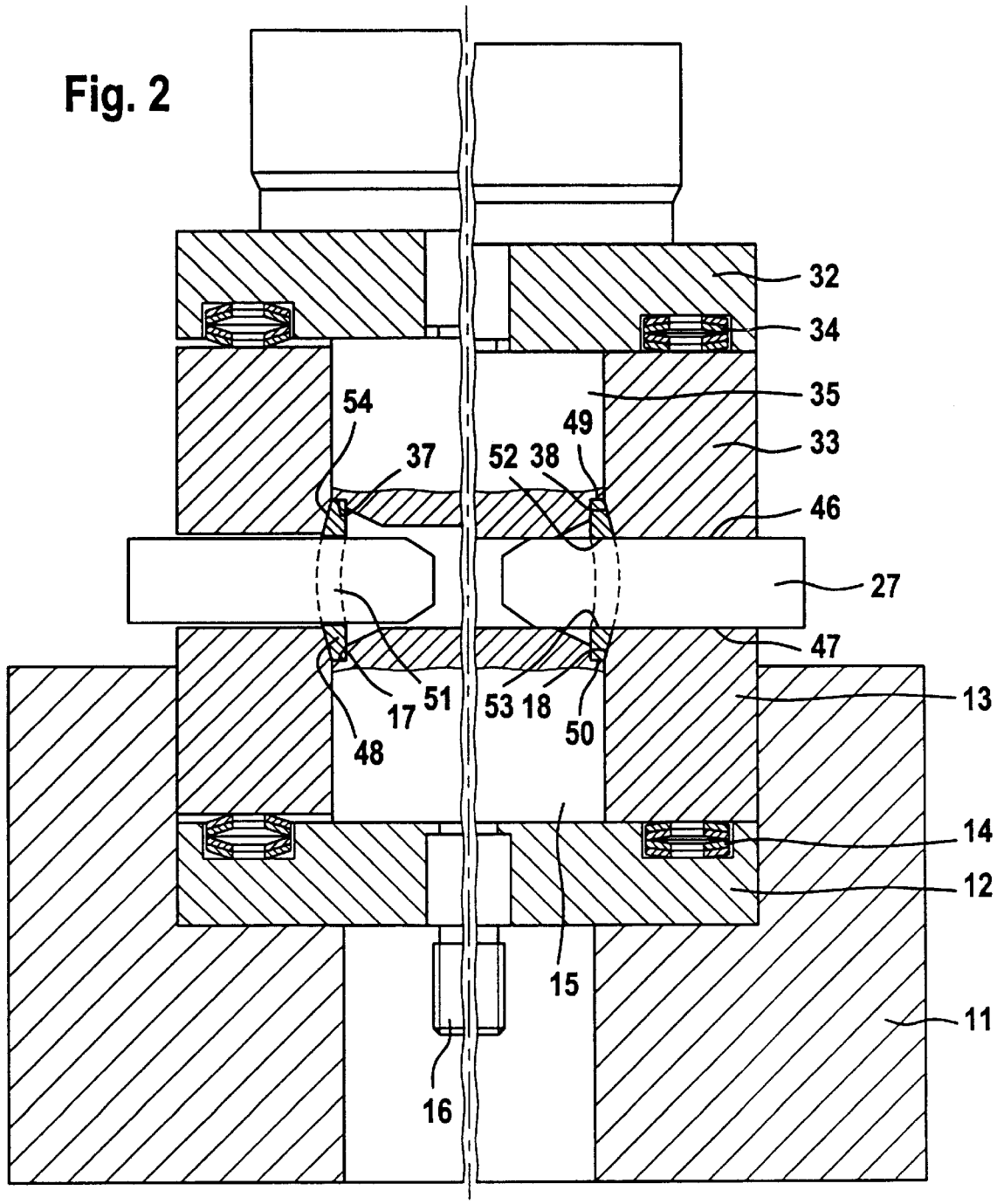
FIG. 2 is a vertical sectional view of a lower tool and upper tool with an inserted ball cage and inserted supporting mandrels.

FIG. 2 shows a sectional view of the base plate 12 with the lower tool 13 and the pressure die 15, as well as the die plate 32 with the upper tool 31 and the pressure die 35. The supporting mandrels 27 are illustrated individually without their holding devices 25 (FIG. 1). A ball cage 48 is inserted between the pressure dies 15, 35.

The left-hand half of FIG. 2 shows a low pressure condition wherein the plate spring packages 14 are nearly compressed and wherein the lower tool 13 rests just above the base plate 12, and the upper tool 33 is still held at a distance from the die plate 32 by the plate spring packages 35. The ball cage 48 is already held in a play-free way between the lower tool 13 and the pressure die 15 on the one hand and between the upper tool 33 and the pressure die 35 on the other hand. There still exists play between the supporting mandrels 27 and the edges 52, 53 of the cage windows 51.

In the right-hand half of the Figure, the pressure of the die is increased to such an extent that the plate spring packages 34, too, are compressed so that the die plate 32 rests on the upper tool 33. The pressure dies 15, 35 are in contact with the end faces 46, 47 of the supporting mandrels 27. In consequence, the annular edges 49, 50 of the ball cage 48 have been moved closer to one another, i.e., the axial length of the cage is reduced. The circumferentially extending window edges 52, 53 of the cage windows 51 have come to rest on the supporting mandrels 27 and have become smoothed thereon, with the outer face 54 of the cage 48 being supported in a dimensionally stable way by the supporting faces 18, 38.

Figure 3:
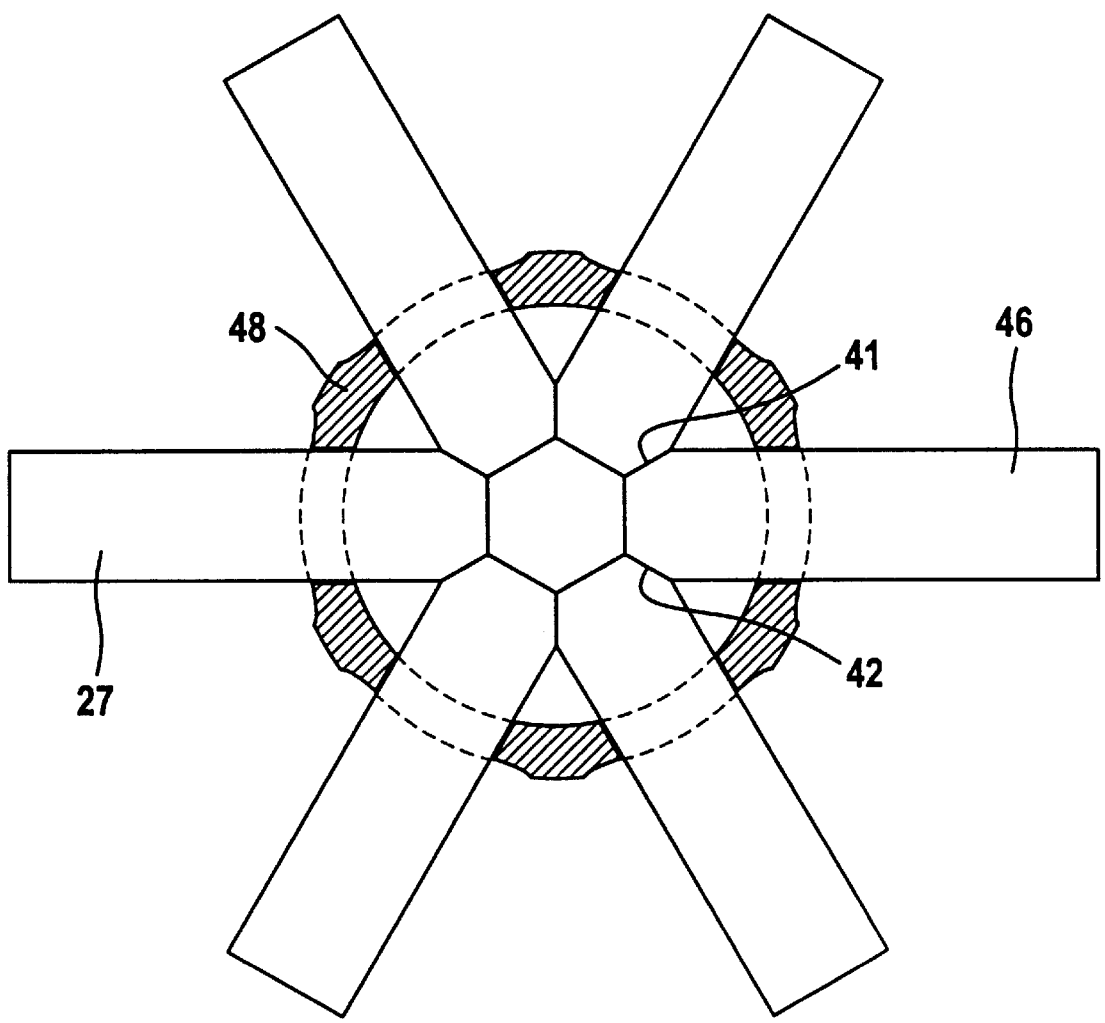
FIG. 3 in a horizontal section, shows a ball cage with inserted supporting mandrels according to FIG. 2.

FIG. 3 is a horizontal sectional view of a ball cage 48 with inserted supporting mandrels 27. The ball cage 48 includes individual cage windows 51 into which the supporting mandrels 27 are inserted radially. At their front ends, the supporting mandrels 27 are provided with wedge faces 41, 42 which contact one another alternately, so that the supporting mandrels 27, in their entirety, form a closed annular member inside the ball cage 48. The respective planar end faces 46, 47 (FIG. 2) of said annular member serve as stops and supports for the lower and upper pressure dies 15, 35 shown in FIGS. 1 and 2.

FIGS. 4(a) through 4(c) show a plan and sectional views of the lower tool 13 with the pressure die 15. The radial guiding grooves 19 for the individual supporting members are particularly clearly visible in the plan view of FIG. 4(c). There is also shown the annular recess 17 which is formed between the lower tool 13 and the pressure die 15. Between each two guiding grooves 19, there are shown bores 44, 45 for holding the lower tool on the base plate.

FIG. 5(a) shows a ball cage 48 and FIG. 5(b) shows a sectional view of the ball cage 48 of FIG. 5(a) along line A—A. In FIGS. 5(a) and 5(b), the ball cage 48 has annular edges 49, 50 and cage windows 51, with the cage windows 51 comprising circumferentially extending edges 52, 53. FIGS. 5(c) and 5(d) show a cage window 51 with said circumferentially extending edges 52, 53 as well as the supporting mandrel 27 in a cross-sectional view along axis "Z". In FIG. 5(c), there still exists play between the supporting mandrel and the edges 52, 53, whereas in FIG. 5(d) the edges 52, 53 have been displaced in such a way that they rest on the supporting tool 27 in a smoothed condition.

What is claimed is:

1. A method of finishing cage windows (51) in a ball cage (48) for a constant velocity universal ball joint, the ball cage (48) having the shape of an annular member comprising two parallel annular edges (49, 50) and a convex outer face (54) and out of which there are punched uniformly circumferentially distributed cage windows (51) each having two circumferentially extending edges (52, 53), the method comprising the step of:

deforming the circumferentially extending edges (52,53) of the cage windows (51) in a non-chip producing way such that said edges (52, 53) are smoothed and parallelized;

wherein the step of deforming includes radially fixing the annular member at the annular edges (49, 50); introducing supporting members (27) into the cage windows

(51) with a small amount of play; and, pressure-loading the annular edges (49, 50), such that the axial distance between the annular edges (49, 50) relative to one another and between the circumferentially extending edges (52, 53) of the cage windows (51) relative to one another is permanently reduced and wherein the circumferentially extending edges (52, 53) are smoothed and parallelized on the supporting members (27).

2. A method as set forth in claim 1, wherein the step of pressure-loading the annular edges (49, 50) further includes radially supporting the outer face (54) of the annular member in a play-free way.

3. A method as set forth in claims 1 or 2, wherein, during the step of pressure loading, only the circumferentially extending edges (52, 53) of the cage windows (51) come into contact with the supporting members (27).

4. A device for finishing cage windows (51) in a ball cage (48) for a constant velocity universal ball joint, wherein the ball cage (48) has the shape of an annular member comprising two parallel annular edges (49, 50) and a convex outer face (54) and out of which there are punched uniformly circumferentially distributed cage windows (51) each having two circumferentially extending edges (52, 53), the device comprising:

a lower tool (13) and an upper tool (33) forming parallel annular recesses (17, 37) for radially fixing the annular edges (49, 50);

supporting members having substantially smooth and parallel surfaces, the supporting members being sized such that they can be introduced into the cage windows (51) of a radially fixed ball cage with a small amount of play relative to the circumferentially extending edges (52, 53); and means for reducing the distance between the lower tool (13) and the upper tool (33) in a direction extending perpendicularly to the planes of the annular recesses (17, 37).

5. A device according to claim 4, wherein the lower tool (13) and the upper tool (33) each include inner supporting faces (18, 38) which are rotationally symmetric concentrically relative to the annular recesses (17, 37) and which, during the deformation process radially support the annular member from the outside in a play-free and dimensionally stable way.

6. A device according to claim 4, wherein the supporting members comprise supporting mandrels (27) which can be radially introduced into the cage windows (51) with a small amount of play.

7. A device according to claim 5, wherein the supporting members comprise supporting mandrels (27) which can be radially introduced into the cage windows (51) with a small amount of play.

8. A device according to claim 6, wherein the lower tool (13) and the upper tool (33) include radial grooves (19, 39) whose number corresponds to the number of supporting mandrels (27) and which, while associated with one another in pairs, jointly serve to guide the supporting mandrels (27) in the lower tool (13) and in the upper tool (33).

9. A device according to claim 7, wherein the lower tool (13) and the upper tool (33) include radial grooves (19, 39) whose number corresponds to the number of supporting mandrels (27) and which, while associated with one another in pairs, jointly serve to guide the supporting mandrels (27) in the lower tool (13) and in the upper tool (33).

10. A device according to claim 4, wherein the supporting mandrels (27), at their inner ends, include wedge faces (41, 42) whereby the mandrels are able, in their radially inner position, to mutually support one another annularly.

11. A device according to claim 5, wherein the supporting mandrels (27), at their inner ends, include wedge faces (41, 42) whereby the mandrels are able, in their radially inner position, to mutually support one another annularly.

12. A device according to claim 6, wherein the supporting mandrels (27), at their inner ends, include wedge faces (41, 42) whereby the mandrels are able, in their radially inner position, to mutually support one another annularly.

13. A device according to claim 7, wherein the supporting mandrels (27), at their inner ends, include wedge faces (41, 42) whereby the mandrels are able, in their radially inner position, to mutually support one another annularly.

14. A device according to claim 8, wherein the supporting mandrels (27), at their inner ends, include wedge faces (41, 42) whereby the mandrels are able, in their radially inner position, to mutually support one another annularly.

15. A device according to claim 9, wherein the supporting mandrels (27), at their inner ends, include wedge faces (41, 42) whereby the mandrels are able, in their radially inner position, to mutually support one another annularly.

16. A device according to either claims 4, 5, 6, 7, 8, 9, 10, 11, 12, 13, 14 or 15, wherein the lower tool (13) and the upper tool (33) are each resiliently supported on a base plate (12) and a die plate (32), respectively, to each of which there are fixed central pressure dies (15, 35).

17. A device according to claim 16, wherein the pressure dies (15, 35) are provided with centering projections (20, 40) which, together with the lower tool and upper tool (13, 33), form the annular recesses (17, 37).

* * * * *